US008930612B2

(12) United States Patent
Goss et al.

(10) Patent No.: US 8,930,612 B2
(45) Date of Patent: Jan. 6, 2015

(54) BACKGROUND DEDUPLICATION OF DATA SETS IN A MEMORY

(75) Inventors: Ryan James Goss, Prior Lake, MN (US); Mark Allen Gaertner, Vadnais Heights, MN (US); David Scott Seekins, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 100 days.

(21) Appl. No.: 13/485,455

(22) Filed: May 31, 2012

(65) Prior Publication Data

US 2013/0326115 A1 Dec. 5, 2013

(51) Int. Cl.
*G06F 12/02* (2006.01)
*G06F 3/06* (2006.01)

(52) U.S. Cl.
USPC .......................................................... 711/103

(58) Field of Classification Search
USPC ........... 711/163, 103, 154; 707/747, 161, 162
See application file for complete search history.

(56) References Cited

U.S. PATENT DOCUMENTS 5,774,550 A 6/1998 Brinkmeyer et al.
7,814,149 B1 10/2010 Stringham
7,937,371 B2 5/2011 Bates et al.
8,055,633 B2 * 11/2011 Whyte .......................... 707/692
8,176,018 B1 5/2012 Bisson et al.
8,234,327 B2 7/2012 Jardetzky et al.
8,407,191 B1 * 3/2013 Nanda .......................... 707/692
2002/0062241 A1 5/2002 Rubio et al.
2006/0149896 A1 * 7/2006 Chang et al. .................. 711/103
2006/0179258 A1 8/2006 Dooley et al.
2008/0005141 A1 * 1/2008 Zheng et al. .................. 707/101
2009/0313312 A1 * 12/2009 Colbeck et al. ............... 707/205
2010/0037004 A1 * 2/2010 Chen ............................ 711/103
2010/0250896 A1 * 9/2010 Matze .......................... 711/216
2010/0274983 A1 10/2010 Murphy et al.
2010/0281212 A1 11/2010 Selvan
2011/0093664 A1 4/2011 Leppard
2011/0213917 A1 9/2011 Davis
2011/0225214 A1 9/2011 Guo
2011/0238634 A1 9/2011 Kobara
2012/0144102 A1 * 6/2012 Langlois et al. .............. 711/103
2012/0191667 A1 * 7/2012 Kopylovitz et al. .......... 707/692
2013/0086006 A1 * 4/2013 Colgrove et al. ............ 707/692
2013/0151756 A1 * 6/2013 Tofano ......................... 711/103
2013/0238832 A1 * 9/2013 Dronamraju et al. ......... 711/103

OTHER PUBLICATIONS

J Kim et al., Deduplication in SSDs: Model and Quantitative Analysis, Apr. 20, 2012, Mass Storage Systems and Technologies (MSST), 2012 IEEE 28th Symposium, pp. 1-12, ISBN: 978-1-4673-1745-0.*

(Continued)

*Primary Examiner* — April Y Blair
*Assistant Examiner* — Edmund Kwong
(74) *Attorney, Agent, or Firm* — Hall Estill Attorneys at Law

(57) ABSTRACT

Apparatus and method for data management in a memory, such as but not limited to a flash memory array. In accordance with some embodiments, a plurality of data sets in a memory are identified as having a common data content and different physical addresses in the memory. A selected one of the data sets is marked as valid data and the remaining data sets are marked as stale data responsive to evaluation of at least one variable parameter associated with the physical addresses at which the data sets are respectively stored.

19 Claims, 4 Drawing Sheets

(56) References Cited

OTHER PUBLICATIONS

H Li, Flash Saver: save the flash-based solid state drives through deduplication and delta-encoding, Apr. 16, 2012, Parallel and Distributed Computing, Applications and Technologies (PDCAT), 2012, $13^{th}$ International Conference, pp. 436-441, ISBN: 978-0-7695-4879-1.*

NIST, Federal Information Processing Standards Publication, "Secure Hash Standard," Apr. 17, 1995, pp. 1-18, Pub-180-1, US.

* cited by examiner

| LBA VALUE | PBA VALUE | HASH VALUE |
|---|---|---|
| 1000 | 1 | 129 |
| 1001 | 2 | 286 |
| 1002 | 3 | 1315 |
| 1003 | 4 | 466 |
| 1004 | 5 | 286 |
| 1005 | 6 | 801 |
| 1006 | 7 | 927 |
| 1007 | 8 | 65 |
| 1008 | 9 | 801 |
| 1009 | 10 | 1408 |
| 1010 | 11 | 114 |

| LBA VALUE | PBA VALUE | HASH VALUE |
|---|---|---|
| 1007 | 8 | 65 |
| 1010 | 11 | 114 |
| 1000 | 1 | 129 |
| 1001 | 2 | 286 |
| 1004 | 5 | 286 |
| 1003 | 4 | 466 |
| 1005 | 6 | 801 |
| 1008 | 9 | 801 |
| 1006 | 7 | 927 |
| 1002 | 3 | 1315 |
| 1009 | 10 | 1408 |

BACKGROUND DEDUPLICATION OF DATA SETS IN A MEMORY

SUMMARY

Various embodiments disclosed herein are generally directed to the management of data in a memory, such as but not limited to a flash memory array.

In accordance with some embodiments, a plurality of duplicate data sets in a memory is identified, each data set having a common data content and a different physical address. At least one of the plurality of data sets is marked as valid data and the remaining data sets are marked as stale data responsive to at least one variable parameter associated with the respective physical addresses.

These and other features and advantages which may characterize various embodiments can be understood in view of the following detailed discussion and the accompanying drawings.

DETAILED DESCRIPTION

Figure 1:
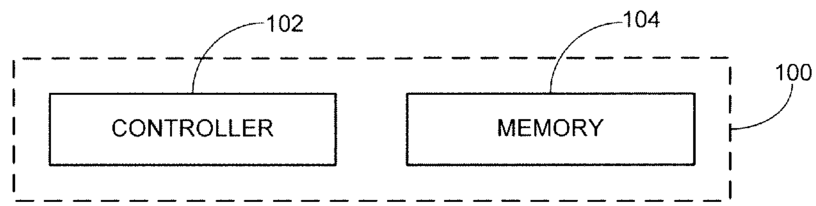
FIG. 1 provides a functional block representation of an exemplary data storage device in accordance with some embodiments.

The present disclosure generally relates to the management of data in a memory, such as but not limited to data stored in a flash memory array.

Host data are often presented for storage to a memory of a data storage device. In a writeback data environment, the device acknowledges receipt of the data, and then schedules the subsequent writing of the data to an appropriate memory location of the device during background processing operations.

The presented write data may be grouped into fixed sized blocks (sectors). The blocks may be provided with logical addresses such as in the form of logical block addresses (LBAs), which facilitate identification of the data at both the host level and the device level.

The device stores the blocks at corresponding physical addresses in the memory. The physical addresses may be arranged as physical block addresses (PBAs). The device maintains a logical-to-physical address conversion mechanism so that, when the host subsequently requests a particular block (LBA), the device can identify the corresponding physical address (PBA) at which the requested block is stored, retrieve a copy of the block from memory, and return the copied data to the host.

It is common in some storage environments to have duplicate blocks of data in the same memory so that different blocks have the same data content. For example, the bit sequence of a first LBA (e.g., LBA 1000) at a first physical address in a memory array may be identical to the bit sequence of a different, second LBA (e.g., LBA 3500) at a second physical address in the array. It is also common for different versions of the same block in the array (e.g., versions 1 and 2 of LBA 1000) to be identical.

Duplicate blocks can undesirably occupy memory space that could otherwise be used to store new data from the user, and can increase the overhead processing demands on the system as the system separately tracks the various duplicate sets of data. Storing and managing duplicate blocks of data can further increase wear of a memory due to the additional processing steps required to store and maintain the duplicate blocks.

Accordingly, various embodiments of the present disclosure are generally directed to identifying and reducing the amount of duplicated data in a memory. As explained below, data sets, such as in the form of fixed sized data blocks with corresponding logical and physical addresses, are subjected to deduplication (dedup) processing.

In some embodiments, the blocks are subjected to a hash function to generate an output hash value. The hash values are compared to group together sets of data having the same content (a "match set"). Variable parameters associated with the respective physical addresses at which the data sets are stored are evaluated in order to identify "survivor" data sets and "victim" data sets. The survivor data sets are retained in their existing physical address locations, and the victim data sets are scheduled for removal from the memory.

The parameters used to select the respective survivor and victim data sets can take a variety of forms, such as age, error rate, accumulated read count, accumulated write/erasure count, retention time, read disturb effects, etc. Generally, the survivor data sets will have physical addresses with better parametric performance, and the victim data sets will have physical addresses with less desirable parametric performance.

These and other features of the present disclosure can be understood beginning with FIG. 1 which illustrates an exemplary data storage device 100. The device 100 includes a controller 102 and a memory module 104. The controller 102 provides top level control for the device 100 and may be configured as a programmable processor with associated programming in local memory.

The memory module 104 can be arranged as one or more non-volatile memory elements such as solid-state memory arrays or rotatable recording discs to provide a main data storage space. While a separate controller 102 is shown in FIG. 1, such is unnecessary as the requisite controller functions can be incorporated directly into the memory module 104.

The host device can be any device that communicates with the storage device 100. For example and not by way of limitation, the storage device may be physically incorporated into the host device, or the host device may communicate with the host device via a network.

Figure 2:
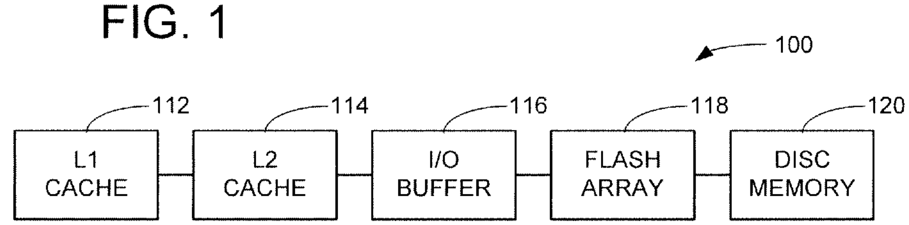
FIG. 2 illustrates a hierarchical cache memory structure useful in a data storage device such as represented in FIG. 1.

The device 100 may use a hierarchical memory structure as set forth in FIG. 2. The hierarchical memory structure utilizes a variety of storage levels (cache levels) to store data. Example cache levels include level 1 (L1) processor cache 112, level 2 (L2) processor cache 114, an input/output (I/O) buffer 116, a flash array 118 and a disc memory 120. Other cache levels can be used, and the various levels shown in FIG. 2 can be omitted. A hybrid disc drive device may utilize all of the levels shown in FIG. 2, whereas a solid-state drive (SSD)

may omit the disc memory block 120 and use the flash array 118 as the main memory store.

As will be recognized, during operation of a device utilizing a hierarchical memory structure as in FIG. 2, a particular data set may be promoted or demoted to different levels depending on data state. For example, a read request from the host for data stored in the flash array 118 may result in a copy of the data being transferred (copied) to the I/O buffer 116 pending transfer to the host. As desired, read caching mechanisms may be employed whereby a copy of the read data are temporarily retained in the I/O buffer after the host transfer. It will be appreciated that the deduplication processing disclosed herein is applied to data sets stored at the same level within a hierarchical memory structure; for example, two (or more) duplicated data sets at the flash array level, etc.

Figure 3:
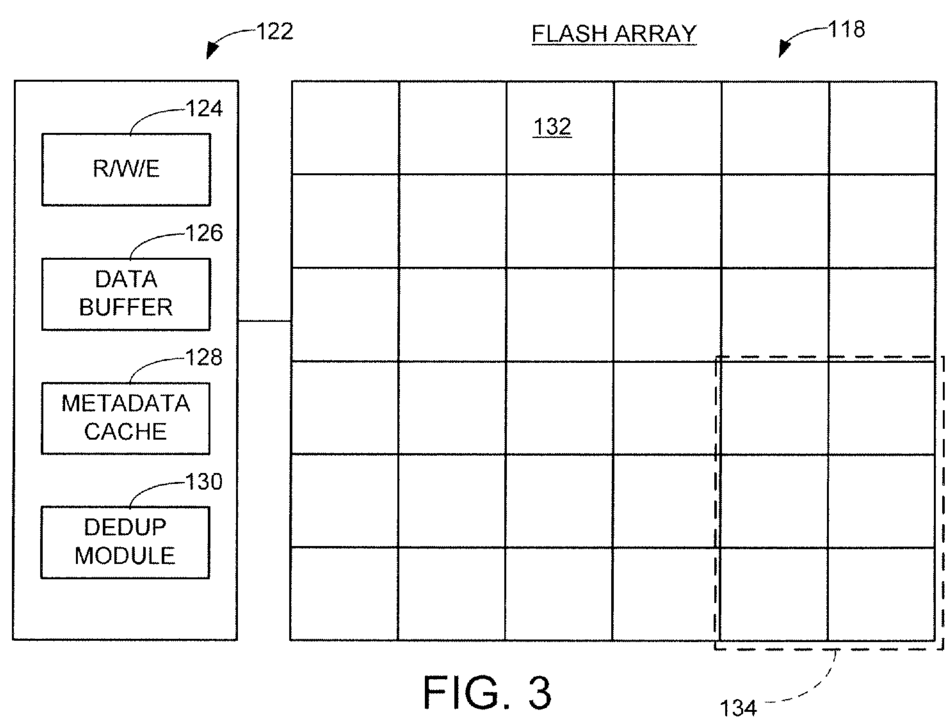
FIG. 3 shows a flash memory array in conjunction with control circuitry in accordance with some embodiments.

FIG. 3 illustrates the flash array 118 in greater detail. The array 118 is made up of individual flash memory cells arranged into rows and columns. The flash cells are configured such that the cells are placed into an initially erased state in which substantially no accumulated charge is present on a floating gate structure of the cell. Data are written by migrating selected amounts of charge to the floating gate. Once data are written to a cell, writing a new, different set of data to the cell often requires an erasure operation to remove the accumulated charge before the new data may be written.

The physical migration of charge across the cell boundaries can result in physical wear to the flash cells. For this reason, flash memory cells are often rated to withstand only a limited number of write/erasure cycles (e.g., 10,000 cycles, etc.). The dedup processing set forth herein may extend the operational life of a flash memory array (as well as other types of memories) by eliminating unnecessary write/erase processing of duplicated data.

Continuing with FIG. 3, the flash memory cells are arranged into erasure blocks 132. Each erasure block 132 is a separately addressable block of cells and represents the smallest unit of memory that can be concurrent erased at a time. Each row of cells in an erasure block is referred to as a page, and each page is configured to store a selected amount of user data. In some cases, multiple pages of data may be stored to the same row through the use of multi-level cells (MLC). In some MLC conventions, two bits are stored in each cell, with the most significant bits (MSB) in the cells indicating the bit sequence of a first page of data, and the least significant bits (LSB) in the cells indicating the bit sequence of a second page of data.

A flash array such as 118 may include any number of erasure blocks 132, including blocks on different dies, strips, planes, chips, layers and arrays. Groups of erasure blocks may be combined into larger, multi-block garbage collection units (GCUs) 134 which are allocated and erased as a unit.

The controller 102 may track control information for each erasure block/GCU in the form of metadata. The metadata can include information such as total number of erasures, date stamp information relating to when the various blocks/GCUs have been allocated, logical addressing (e.g., logical block addresses, LBAs) for the sets of data stored in the blocks 132, and corresponding physical addresses (PBAs in the form of GCU, block, page, bit location, etc.).

Block-level wear leveling may be employed by the controller 102 to track the erase and write status of the various blocks 132. New blocks can be allocated for use as required to accommodate newly received data. The metadata and other control information to track the data may be stored in each erasure block/GCU, or stored elsewhere such as in specific blocks dedicated to this purpose.

Control circuitry 122 used to interface with the array 118 includes a read/write/erase (R/W/E) circuit 124, a data buffer 126, a metadata cache 128 and a deduplication (dedup) module 130. The R/W/E circuit 124 coordinates transfers of data to and from the erasure blocks as well as garbage collection operations to erase and reallocate the blocks. The circuit 124 uses the data buffer 126 to temporarily store data blocks during such operations. Because flash memory cells usually cannot be overwritten with new data but instead require an erasure operation before new data can be written, the circuit 124 writes each new set of data received from the host to a different location within the array 118.

The metadata cache 128 provides a local storage memory to receive metadata associated with the various transfers carried out by the circuit 124. Both the data buffer 126 and the metadata cache 128 may be volatile memory such as dynamic random access memory (DRAM). The dedup module 130 operates to identify and mitigate duplicated data sets within the flash array 118.

Figure 4:
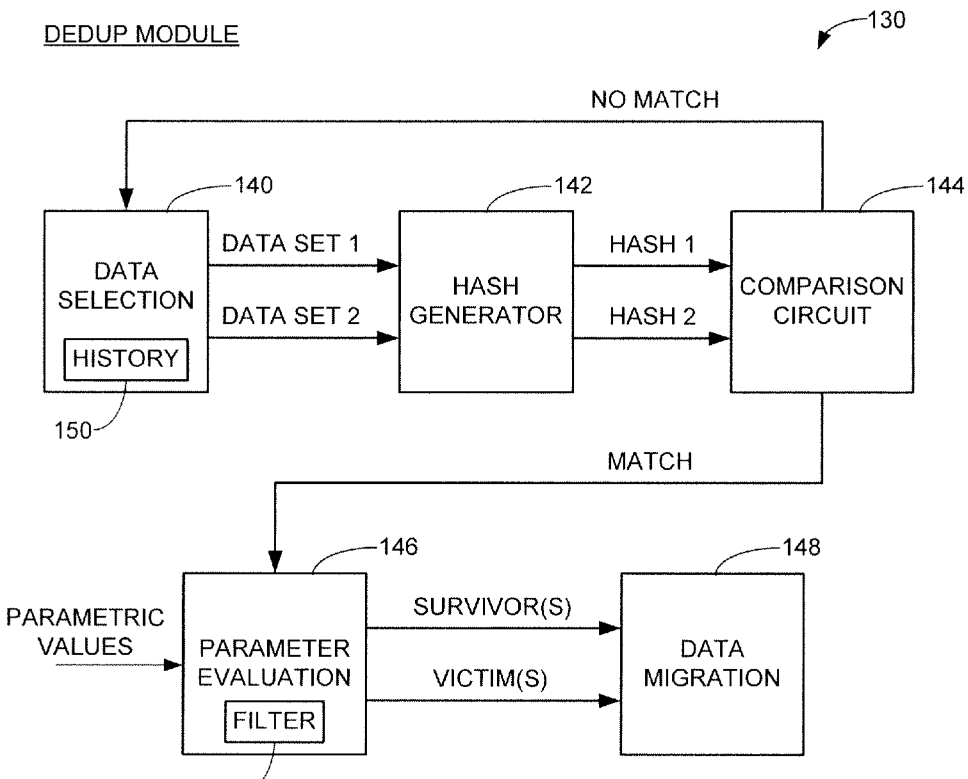
FIG. 4 is a functional block representation of deduplication (dedup) module in FIG. 3 in accordance with some embodiments.

As shown in FIG. 4, the dedup module 130 includes a data selection block 140, a hash generator 142, a comparison circuit 144, a parameter evaluation block 146 and a data migration block 148. Other configurations can be used. The various blocks set forth in FIG. 4 can be realized in hardware or carried out by a controller such as the controller 102 in FIG. 1 using associated programming stored in memory. It is contemplated albeit not necessarily required that the dedup module 130 operates as part of the device background processing, so that the various operations set forth in FIG. 4 are carried out at times when the device 100 has relatively low I/O host demand.

The data selection block 140 initially selects various sets of data for evaluation. A variety of criteria may be used as part of the selection process. In some embodiments, "cold" data sets are selected for evaluation; for example, some predetermined percentage, such as the lowest 20% of all stored data sets, that have received the fewest numbers of read and/or write accesses in a most recent elapsed time period may be selected for evaluation. Alternatively, all of the data sets that have not been accessed over some predetermined time period may be selected for evaluation. The evaluation is not necessarily limited to cold data sets, although the cost-benefit ratio for deduplicating data may be generally reduced for data with relatively higher access rates ("hot data").

The access history of the various blocks can be tracked in a number of ways, such as through a history log 150 maintained by or otherwise accessible by the data selection block 140. The history log may track read/write accesses at the LBA, page, erasure block and/or GCU levels to identify different sets of data with the lowest relative access rates.

The data selection block 140 proceeds during operation to identify multiple data sets for comparison. Two such data sets are represented in FIG. 4 as "DATA SET 1" and "DATA SET 2." While not limiting, each data set may correspond to a particular block (LBA) of data, or multiple such blocks of data.

Each of the selected data sets are respectively applied to a hash generator 142, which applies a selected hash function to the data sets to generate corresponding hash values ("HASH 1" and "HASH 2"). It will be appreciated that multiple sets of different hash values can be generated. A hash function can be characterized as any number of different types of algorithms that map a first data set (a "key") of selected length to a second data set (a "hash value") of selected length. In many cases, the second data set will be shorter than the first set. The hash function(s) used by the hash generator block 142 should generally be transformative, referentially transparent, and collision resistant.

The term "transformative" relates to the changing of the input value by the hash function in such a way that the contents of the input value (key) cannot be recovered through cursory examination of the output hash value. Referential transparency is a characteristic of the hash function such that the same output hash value will be generated each time the same input value is presented. Collision resistance is a characteristic indicative of the extent to which two inputs having different bit values do not map to the same output hash value. The hash functions can take any number of forms, including checksums, check digits, fingerprints, cryptographic functions, parity values, etc.

In some embodiments, one hash value can be a selected bit value in the input data set, such as the least significant bit (LSB) or some other bit value at a selected location, such as the $13^{th}$ bit in the input value. Other hash values can involve multiple adjacent or non-adjacent bits, such as the as the $13^{th}$ and $14^{th}$ bits, the first ten odd bits ($1^{st}$, $3^{rd}$, $5^{th}$, . . . ), etc.

More complex hash functions can include a Sha 256 hash of the input data, as well as one or more selected bit values of the Sha 256 hash value (e.g., the LSB of the Sha hash value, etc.). Once generated, the hash values may be stored in local memory such as the data buffer 126 (FIG. 3). In some cases, the hash values may serve as digital fingerprints of the data to identify redundant copies of the associated content. The values may be generated based on the content of the data sets (files) with certain control data, such as headers, being excluded from the value generation. For example, in the case of compressed images (e.g., JPEG files), the hash values may be generated based on the image content data so that the hash values are equal for all copies of the same image irrespective of other data appended to the data sets, such as control data.

The comparison circuit 144 compares the respective hash values to determine whether a match is detected. If the hash values do not match, the data selection block 140 moves on to select new respective sets of data for comparison. A benefit to using multiple levels of hash values is that if a quick mismatch is detected using a simple hash function, more complex hash function calculations and/or comparisons may be avoided. Hash values generated by a sufficiently strong hash function (e.g., a Sha 256 hash, etc.) should be compared before concluding that the two data sets are identical.

If the hash values are found to match, the module 130 continues with a parametric evaluation by block 146. The block 146 evaluates the relative parametric states of the physical addresses of the data sets in order to determine which data set(s) should survive and which data set(s) should be victims and thus jettisoned from the array.

A variety of parameters can be evaluated. In some embodiments, the respective total accumulated numbers of read/write accesses for the respective addresses can be compared, with the survivor selected as the data stored in the location having fewer accesses. Similarly, the number of erasures of the respective addresses can be compared and the survivor selected as the data in a location having been subjected to fewer erasure cycles. In other embodiments, the respective error rates of data retrieved from the different physical addresses can be compared, with the survivor selected as the data from the location having better error rate performance.

In still other embodiments, the staleness, aging or retention time can be parametric factors taken into account in determining which data to keep and which data to jettison. An evaluation of read disturb effects, such as charge drift in the amount of accumulated charge on the devices can be used. Other parameters can include temperature (including temperature at the time of writing or localized temperature variations within the array), the extent to which other adjacent data are stale or current, read and/or write speed, the number of associated forward pointers in the metadata, and any other variable parameters associated with the performance or programmed state of the data locations, so long as the parameter values change over time. In some embodiments, multiple parameters may be combined using a bloom filter module 152 to provide a weighted factor approach to adjudge parametric performance of the respective physical addresses. For example, an overall parametric state S may be determined for each location using a relation such as:

$$S=K1(\text{Reads})+K2(\text{Writes})+K3(\text{Erasures})+K4(\text{Age})+K5(\text{Temp})+K6(\text{delta-}V) \quad (1)$$

where Reads and Writes are the respective total numbers of accumulated read and write accesses, Erasures is the total number of erasure cycles applied to the respective locations, Age is an elapsed time interval since the respective data sets were written, Temp is a temperature reading/range/zone in which the respective location has operated, and delta-V is an assessment of variation in read voltage thresholds used to recover the data. The latter value provides an indication of charge drift, such as but not limited to read disturbance. K1-K6 are appropriate constants to provide suitable weighting for these factors. The data set having the lower S value may be selected as the survivor in this case.

The various parametric values for the respective physical addresses may be tracked at any suitable resolution, including at the cell, page, erasure block, GCU, chip, die, strip, plane and/or layer level. The data may be maintained in a separate location and recalled by the parametric evaluation block 146 as needed. It will be appreciated that the parametric values utilized herein are variable and hence, can change/increment over time. Hence, various static characteristics of the physical addresses that do not change, such as whether the addresses are volatile v. non-volatile, whether the addresses are in different cache levels, etc., are not classified as parameters and are not used in the parametric evaluation.

Figure 5:
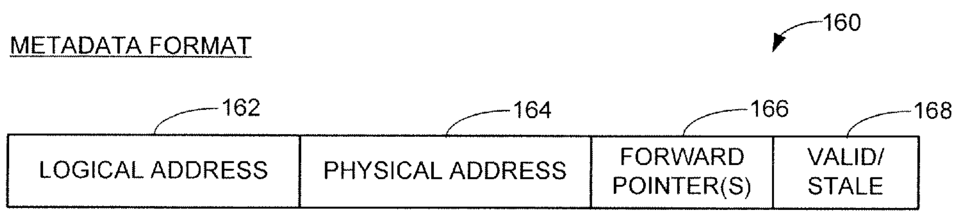
FIG. 5 provides an exemplary metadata format useful in some embodiments.

Once the survivor(s) and victim(s) have been declared, the data migration block 148 operates to mark the status of each data set and schedule the removal of the victim data set(s) from the array. FIG. 5 provides a simplified format for a metadata entry 160 suitable for use by the device 100 in accordance with some embodiments. Other formats can readily be used. The exemplary format of FIG. 5 includes a logical address field 162, a physical address field 164, a forward pointer field 166 and a status field 168. Respective logical and physical address data are stored in the fields 162, 164. The forward pointer field 168 provides one or more forward pointers to direct the system to the most recent version of the data where multiple blocks sharing the same logical address (e.g., multiple versions of LBA 1000, etc.) are stored in the array.

The status field 168 indicates whether the data are valid or stale. In some embodiments, the data migration block 148 will set the status field entry for the survivor(s) as "valid" and will set the status field entry for the victim(s) as "stale." Once sufficient numbers of stale data sets are identified in a particular GCU, the data migration block 148 may further initiate a garbage collection operation to migrate currently valid data from the selected GCU to a different GCU, perform an erasure cycle, and place the erased GCU in the allocation pool. It will be appreciated that the victims need not necessarily be immediately jettisoned from the array, so long as the system identifies such as no longer being current data.

In cases where the victim and survivor data sets have different logical addresses (e.g., different LBAs), one or more forward pointers may be generated and placed into the fields 166 so that, should a subsequent host request be made for the victim LBA, the data stored in the survivor LBA will be returned to the host.

Figure 6:
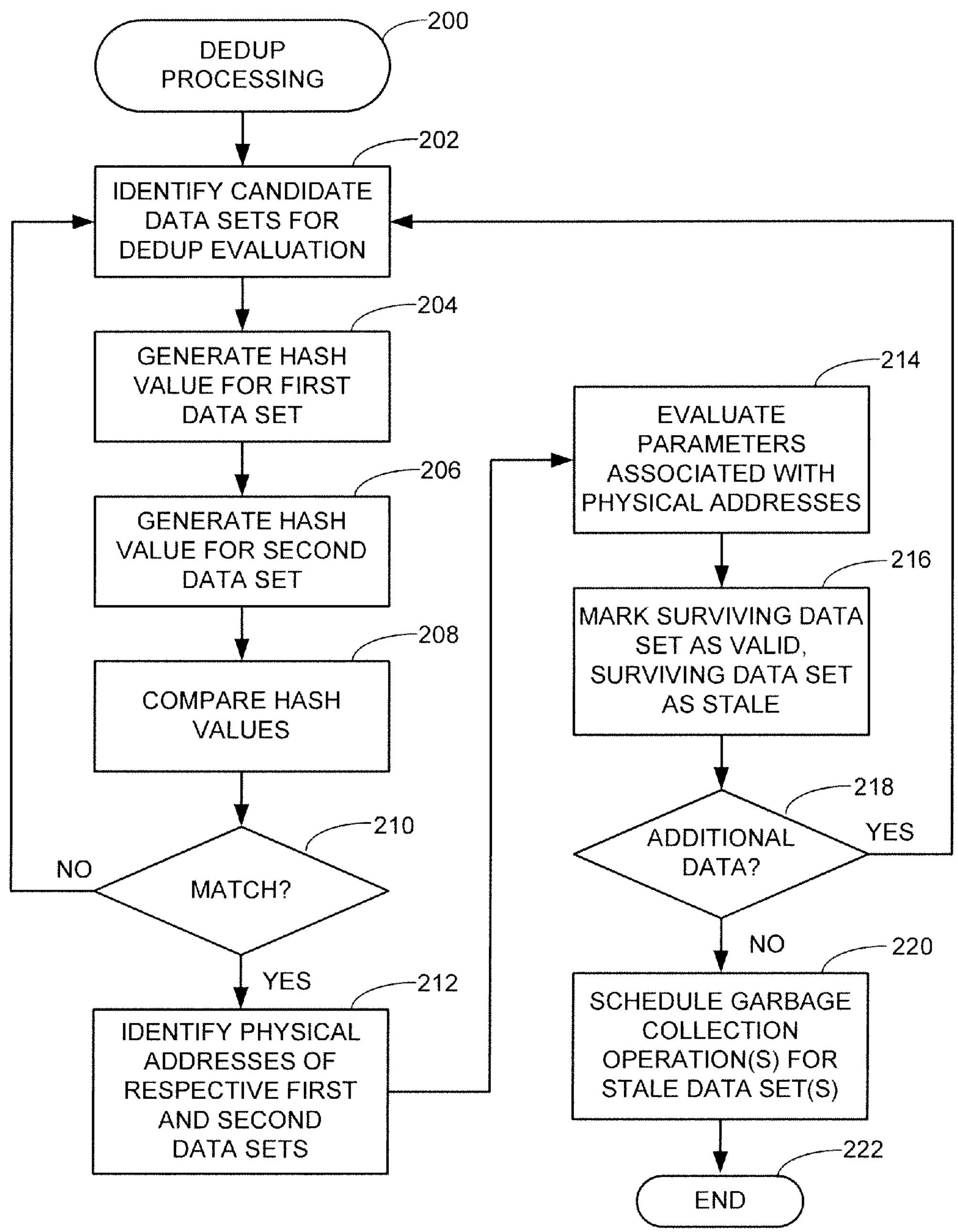
FIG. 6 is a flow chart for a DEDUP PROCESSING routine carried out in accordance with some embodiments.

FIG. 6 provides a flow chart for a DEDUP PROCESSING routine 200 generally illustrative of steps carried out in accordance with the foregoing discussion. Other processing steps and processing ordering can be used, so the routine 200 is merely exemplary. The routine will be discussed in terms of dedup processing of data stored in the array 118 of FIGS. 2-3, although such is not limiting. At step 202, candidate data sets are identified for dedup evaluation. Any number of selection criteria can be used. As discussed above, in some embodiments all, or less than all, of the data in the memory array 118 can be evaluated. The selection process can involve identifying those data sets having the lowest LRU (least recently used) values or the lowest overall read/write access counts over a particular period of elapsed time. Data sets having multiple current versions of the same LBA can be selected for evaluation as well.

Step 204 involves selecting a first data set, such as a first LBA, and generating a hash value using a suitable hash function. Multiple hash functions and multiple corresponding hash values for the first data set can be generated as desired. The first data set is not limited to a single block (LBA), as the first data set can comprise multiple LBAs. Step 206 repeats these operations for a second data set, such as a different, second LBA (or second group of LBAs). It is contemplated that the respective first and second data sets will be in different erasure blocks/GCUs, although such is not necessarily required.

The respective hash values are compared at step 208 in order to determine whether the hash values match, as indicated by decision step 210. If not, the routine continues to compare a new pair of data sets. In some embodiments, the first data set is maintained as part of the comparison processing so that the hash value for the first data set is successively compared to the hash values for each of a plurality of other data sets.

At such time that a match set is identified, the flow continues to step 212 where the physical addresses of the respective first and second data sets are identified. Parametric evaluation of the physical addresses is carried out at step 214 to select one or more surviving data sets and one or more victim data sets. At step 216, the survivors are marked as valid and the victims are marked as stale, such as in the metadata entries for the respective data sets.

Decision step 218 determines whether additional data sets are to be evaluated; if so, the process returns to step 202. Otherwise, the flow continues to step 220 where one or more garbage collection operations are scheduled to jettison the stale victim data from the array, after which the routine ends at step 222.

In a further embodiment, hash values are initially calculated for all of the data sets identified in step 202 of the routine. The hash values are placed into a table, and the table is sorted, such as by ascending or descending order. The table can then be searched to identify successive entries that share the same hash value.

Figure 7:
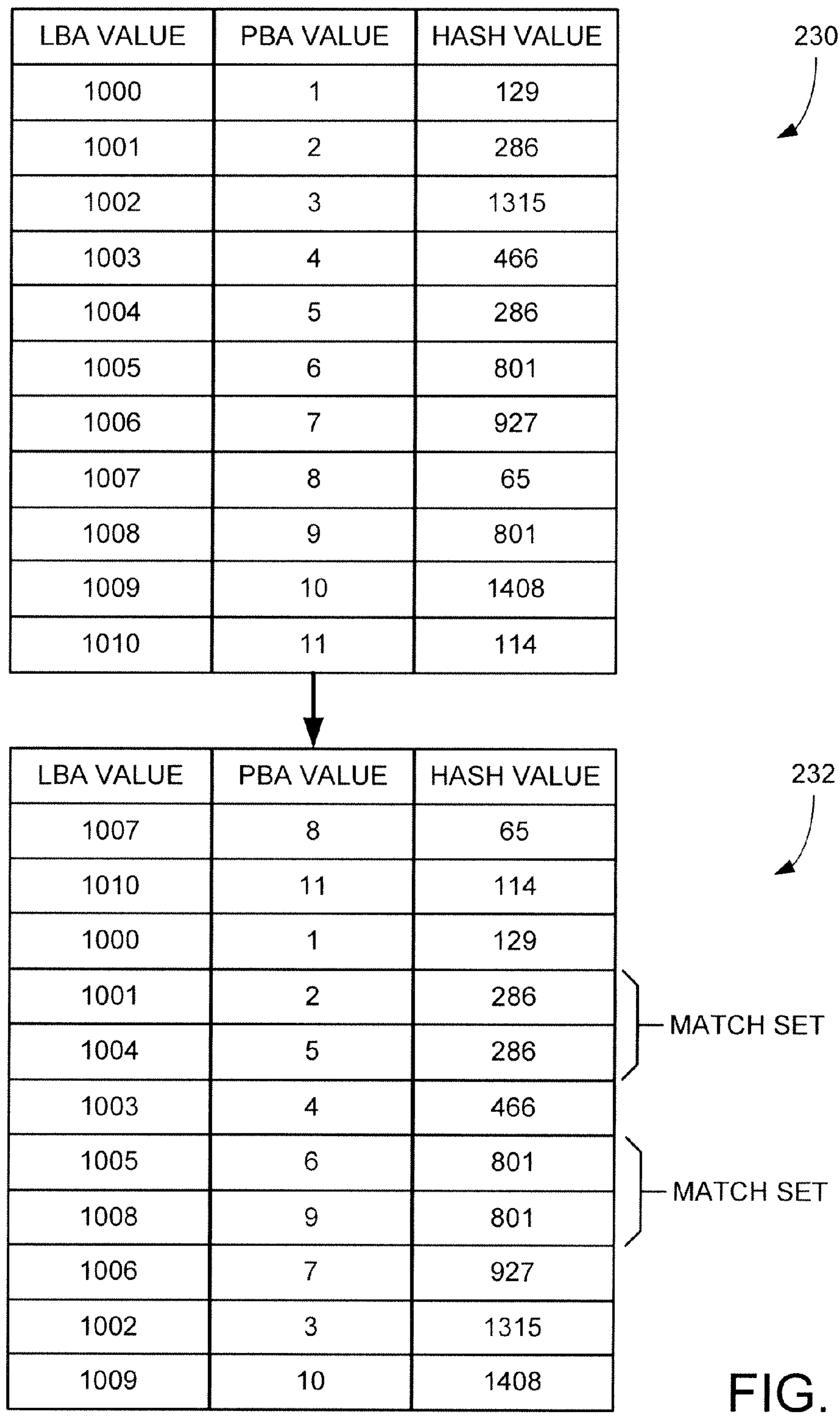
FIG. 7 shows a table of hash values for a plurality of data sets that may be sorted to identify match sets in accordance with some embodiments.

This sequence is illustrated in FIG. 7, which shows a table 230 for a small population of LBAs 1000-1010 subjected to dedup processing. In practice, a much larger number of LBAs may be selected, and the selected LBAs may not be in sequential order. The selected LBAs are shown to have simplified physical addresses of PBA 1 to PBA 11. Again, the actual format of the physical addresses may involve a more complex format involving multiple bits to identify different GCU/block/page/bit locations, etc., and the actual physical addresses may not be consecutive as depicted in the table.

Hash values are generated for the data in each LBA, and the hash values are added to the table. Once populated, the table is sorted, as depicted at 232, so that the hash values are arranged in ascending order. It can be seen that two match sets are provided for LBAs 1003/1004 and LBAs 1005/1008. Evaluation of the associated physical addresses 2/5 and 6/9 will follow to select the surviving and victim LBAs in each pair.

It will be appreciated that reducing the amount of duplicated data sets in a memory as disclosed herein may provide a number of benefits, such as increasing the available data space within the memory to accommodate the storage of new data, reducing overhead processing required to track multiple sets of the same data, and reducing wear. In some embodiments, the hash values can be retained so that, upon presentation of a new set of data for transfer to the memory, the comparison steps can be carried out prior to the storage of the new set of data to avoid the storage of duplicated data to the array.

While various embodiments have been discussed in terms of a flash memory array, such is merely exemplary and not limiting. Any number of different types of memory can be evaluated for the presence of duplicated data therein.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:

storing a plurality of data sets in a memory at different physical locations, each physical location having an associated physical address;

determining that a first data set and a second data set from the plurality of data sets share a common data content using respective first and second hash values;

comparing a first total number of write/erase cycles that have been applied to the first physical address to a second total number of write/erase cycles that have been applied to the second physical address;

and marking a selected one of the first or second data sets as valid data and the remaining one of the first or second data sets as stale data responsive to the comparison of the respective first and second total numbers of write/erase cycles.

2. The method of claim 1, further comprising retaining the selected one of the first or second data sets marked as valid data in the memory at the associated physical location and jettisoning the remaining one of the first or second data sets from the memory.

3. The method of claim 1, in which the memory is characterized as a flash memory array comprising a plurality of garbage collection units (GCUs) each erased and reallocated as a unit, the first data set stored in a first GCU and the second data set stored in a different, second GCU.

4. The method of claim 1, in which each of the first and second data sets has a different logical address.

5. The method of claim 1, in which the first and second data sets are identified as respective first and second cold data sets.

6. The method of claim 1, wherein the first and second cold data sets are selected from a predetermined percentage of the plurality of data sets that have received a fewest number of access operations during the elapsed time interval.

7. The method of claim 1, further comprising scheduling a garbage collection operation to jettison the stale data from the array.

8. An apparatus comprising a memory in which a plurality of data blocks are stored at different physical locations therein, and a deduplication processor configured to identify first and second data blocks in the memory having a common data content, to compare a first variable parameter associated with the physical location of the first data block to a second variable parameter associated with the physical location of the second data block, and to select one of the first or second data blocks for retention in the memory and to select the remaining one of the first or second data blocks for jettisoning from the memory responsive to the comparison of the at least one variable parameter for each physical location, the first variable parameter comprising a total number of erasure cycles applied to the first physical location, the second variable parameter comprising a total number of erasure cycles applied to the second physical location.

9. The apparatus of claim 8, in which the deduplication processor comprises a hash generator which generates respective first and second hash values responsive to the data content of the first and second data blocks, and a comparison circuit which compares the first and second hash values to identify the first and second data blocks as duplicate blocks.

10. The apparatus of claim 8, in which the deduplication processor further comprises a parametric evaluation module which generates each of the first and second variable parameters as a composite state value derived in relation to the total number of erasure cycles for the associated physical location and in relation to a measured temperature at the time of writing of the respective first and second data blocks to the respective first and second physical locations.

11. The apparatus of claim 8, in which the deduplication processor comprises a selection module which selects a population of data blocks for evaluation responsive to access rates associated with the data blocks, the selected population characterized as a predetermined percentage of the data blocks having the fewest number of accesses over the selected time period.

12. The apparatus of claim 8, in which the memory is characterized as a flash memory array comprising a plurality of erasure blocks, the first data block stored in a first erasure block of the flash memory array and the second data block stored in a different, second erasure block of the flash memory array.

13. The apparatus of claim 8, in which the at least one variable parameter further comprises a measured error rate associated with the retrieval of data from the respective physical locations, and the one of the first or second data blocks selected for retention in the memory has an associated physical location with a lower measured error rate.

14. A data storage device comprising a main memory and a control circuit adapted to direct data transfer operations between the main memory and a host device, the control circuit further adapted to remove duplicate data sets from the main memory by identifying first and second data sets sharing a common data content and stored at different physical locations within the main memory each having an associated physical address, marking a selected one of the first or second data sets as valid data and the remaining one of the first or second data sets as stale data responsive to a variable parameter associated with each of the respective physical locations, and jettisoning the stale data from the main memory, the variable parameter comprising measured temperatures at the time of writing of the first and second data sets to the different physical locations.

15. The data storage device of claim 14, in which the control circuit is further adapted to generate a first hash value from the data content of the first data set and a second hash value from the data content of the second data set, and to compare the first and second hash values.

16. The data storage device of claim 14, in which the main memory is characterized as a flash memory array.

17. The data storage device of claim 16, in which the variable parameter further comprises a total accumulated count of erasure operations upon the respective physical locations of the first and second data sets.

18. The data storage device of claim 14, in which the first and second data sets are selected from a population of cold data sets in the memory as a subset of a total number of data sets in the memory, each cold data set having been accessed a total number of times less than a selected threshold over an elapsed time interval.

19. The data storage device of claim 14, in which the control circuit uses a bloom filter to combine a plurality of variable parameters associated with each of the different physical locations of the first and second data sets.

* * * * *